United States Patent
Devarapalli et al.

(10) Patent No.: US 7,792,072 B2
(45) Date of Patent: Sep. 7, 2010

(54) METHODS AND SYSTEMS FOR CONNECTING MOBILE NODES TO PRIVATE NETWORKS

(75) Inventors: Vijay Devarapalli, Sunnyvale, CA (US); Rajeev Koodli, Sunnyvale, CA (US)

(73) Assignee: Nokia Inc., Irving, TX (US)

(*) Notice: Subject to any disclaimer, the term of this patent is extended or adjusted under 35 U.S.C. 154(b) by 543 days.

(21) Appl. No.: 11/010,594

(22) Filed: Dec. 13, 2004

(65) Prior Publication Data

US 2006/0126645 A1 Jun. 15, 2006

(51) Int. Cl.
*H04W 4/00* (2009.01)
(52) U.S. Cl. .............. 370/328; 455/410; 455/432.1; 455/444; 370/331
(58) Field of Classification Search ........ 455/432.1–444, 455/552.1, 410, 411; 726/15; 370/351, 331–333; 435/432–433

See application file for complete search history.

(56) References Cited

U.S. PATENT DOCUMENTS

| | | | |
|---|---|---|---|
| 2002/0035699 A1* | 3/2002 | Crosbie | 713/201 |
| 2002/0049902 A1 | 4/2002 | Rhodes | |
| 2003/0123421 A1* | 7/2003 | Feige et al. | 370/338 |
| 2003/0224788 A1* | 12/2003 | Leung et al. | 455/435.1 |
| 2004/0018854 A1* | 1/2004 | Gorsuch | 455/552.1 |
| 2004/0073642 A1* | 4/2004 | Iyer | 455/433 |
| 2004/0120295 A1* | 6/2004 | Liu et al. | 370/338 |
| 2004/0203749 A1 | 10/2004 | Iyere et al. | |
| 2005/0063359 A1* | 3/2005 | Jagadeesan et al. | 370/352 |
| 2005/0101321 A1 | 5/2005 | Ikeda et al. | |

FOREIGN PATENT DOCUMENTS

| | | | |
|---|---|---|---|
| EP | 1463257 | * | 9/2004 |
| WO | WO 01/19053 | | 3/2001 |
| WO | WO 03/045034 | | 5/2003 |

OTHER PUBLICATIONS

Montenegro et al., "Sun's SKIP Firewall Traversal for Mobile IP" (RFC 2356), Jun. 1998.*
Adrangi et al., http://tools.ietf.org/html/draft-ietf-mobileip-vpn-problem-statement-req-03, Jun. 2003.*
Perkins, Charles E., "Mobile IP," *IEEE Communications Magazine*, pp. 84-99, May 1997.
International Search Report dated Apr. 24, 2006 for corresponding PCT Application Serial No. PCT/IB2005/003615 filed Nov. 30, 2005.

* cited by examiner

*Primary Examiner*—Lester Kincaid
*Assistant Examiner*—Daniel Lai
(74) *Attorney, Agent, or Firm*—Mintz, Levin, Cohn, Ferris, Glovsky and Popeo, P.C.

(57) ABSTRACT

When mobile node is connected to an access point outside the private network, a tunnel is formed between the mobile node and a home agent on the private network for the transfer of packets. When, the mobile node roams into a region accessible to the private network, the mobile node is connected to the private network using a private network access point while maintaining the tunnel between the mobile node and the home agent.

22 Claims, 8 Drawing Sheets

METHODS AND SYSTEMS FOR CONNECTING MOBILE NODES TO PRIVATE NETWORKS

FIELD

The present inventions are directed to methods and systems for connecting mobile nodes to private networks. In addition, the present inventions are directed to methods and systems for maintaining connection of a mobile node to a private network when the mobile node is roaming including when the mobile node roams into or out of the private network.

BACKGROUND

Private networks can allow companies and other organizations to provide a shared space (e.g., an intranet) for employees or organization members. A private network may be limited geographically and/or can be a virtual private network (VPN) with secure communication over an external/untrusted IP network such as the Internet.

One increasingly important aspect of private networks is the ability for network users to have access to the private network using access points outside the private network. In particular, mobile users will often access the private network using such access points and may even wish to change access points as the mobile user roams. The mobile user may even enter a geographical region served by the private network and can then change from an access point outside the private network to an access point within the private network.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present inventions are directed to methods and systems for connecting mobile nodes to private networks. In addition, the present inventions are directed to methods and systems for maintaining a connection of a mobile node to a private network when the mobile node is roaming including when the mobile node roams into or out of the private network.

Generally, the mobile node is connected to the private network using a home agent. The mobile node has a home address corresponding to the home agent. Correspondent nodes send packets for the mobile node to the home address. In one embodiment, the mobile node is capable of Mobility for Internet Protocol version 6 (MIPv6) and a tunnel is created directly between the mobile node and the home agent. Packets are sent between the mobile node and the home agent using IPsec security associations and encryption. A firewall for the private network is configured to pass IPsec encrypted packets that are directed to a known home agent. The tunnel can be maintained, with or without IPsec encryption, if the mobile node roams into the private network.

In another embodiment, the tunnel between the mobile node and home agent includes a tunnel between the mobile node and a VPN gateway and a tunnel between the VPN gateway and the home agent. Packets for the mobile node are sent to the home agent using the home address. The home agent sends the packets to the VPN gateway using an internet protocol transport address and the VPN gateway then forwards the packets to the mobile node. A tunnel directly between the home agent and the mobile node can be formed, while still maintaining the session, if the mobile node enters the private network.

Figure 1:
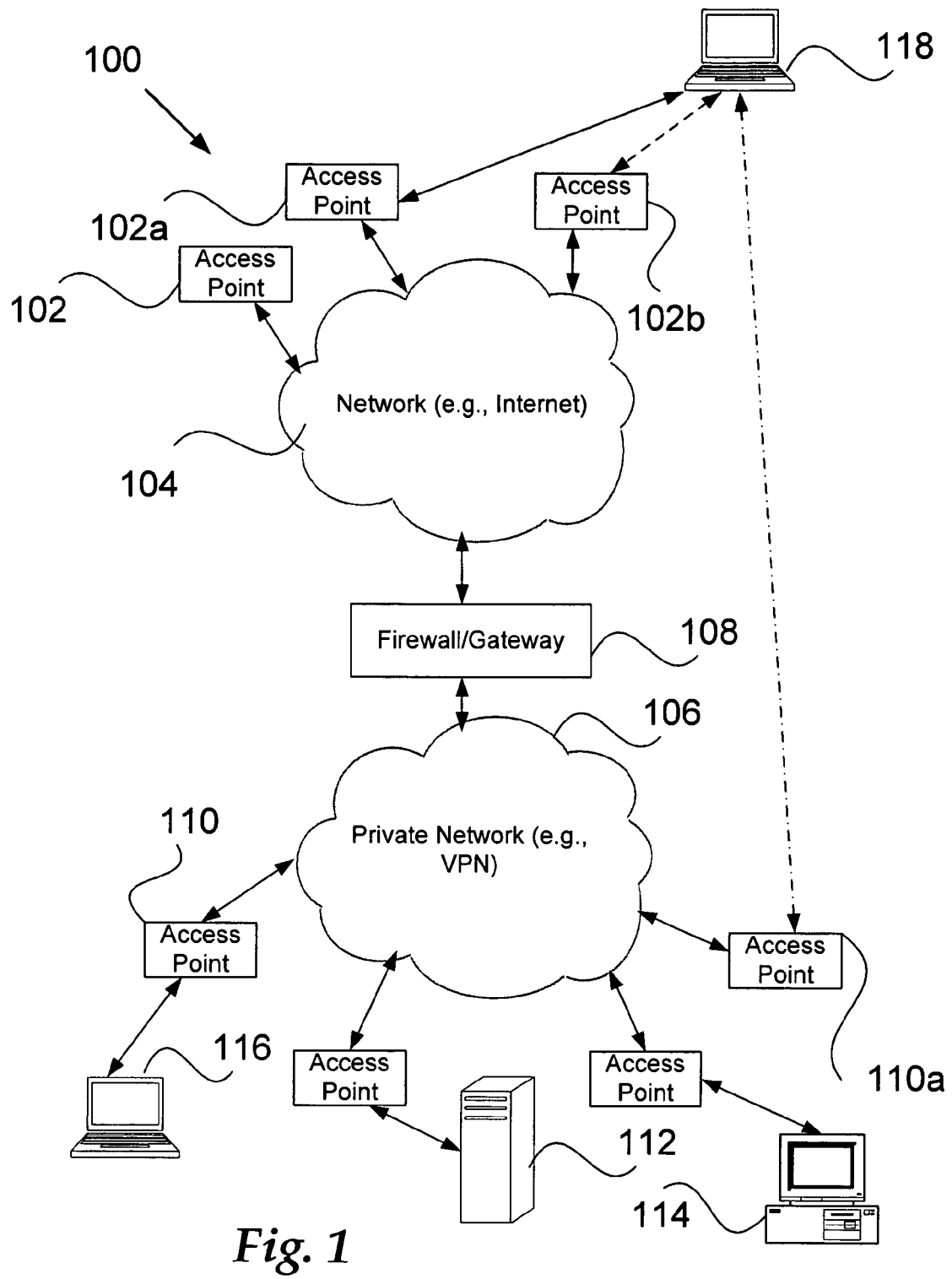
FIG. 1 is a schematic illustration of one embodiment of an operating environment, according to the inventions.

FIG. 1 shows a functional block diagram illustrating one embodiment of an operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes access points 102 (including access points 102a, 102b) that are connected to a network 104, such as the Internet. A private network 106 (e.g., an intranet or a virtual private network) is connected to the network 104 through a firewall/gateway 108. The gateway can be a private network gateway such as, for example, a virtual private network (VPN) gateway. There are various access points 110 to the private network 106. Servers 112, fixed nodes 114 (e.g., desktop computers), and mobile nodes 116 can be connected to the private network 106 through the access points 110. In addition, one or more mobile nodes 118 can be connected to the private network 106 through the access points 102, network 104, and firewall/gateway 108 or, alternatively, through access points 110.

The mobile node 118 can initially be connected to access point 102a (represented by solid line) but can then roam away from access point 102a and come into the territory served by access point 102b (represented by dashed line) or even enter a region serviced by access point 110a that is directly connected to private network 106 (represented by dashed/dotted line). It is generally desirable to maintain a session even when the mobile node roams to a new access point.

Generally, access points 102, 110 and firewall/gateway 108 may include virtually any computing device capable of connecting to another computing device to send and receive information over a network, including routers, firewalls, and the like. Thus, while these devices are called access devices or gateways, they may actually be implemented as a router, or similar network device.

The types of devices for mobile nodes 116, 118, fixed nodes 114, and servers 112 may also include virtually any computing device capable of communicating over a network using a wired or wireless communications medium such as personal computers, multiprocessor systems, microprocessor-based or programmable consumer electronics, network PCs, cellular telephones, smart phones, pagers, Personal Digital Assistants (PDAs), handheld computers, radio frequency (RF) devices, infrared (IR) devices, integrated devices combining one or more of the preceding devices, and the like.

Network 104 and private network 106 are configured to employ any form of computer readable media for communicating information from one electronic device to another. These networks are generally capable of communication under layers 3 and 4 of the OSI model. Network 104 and private network 106 can include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Communication links within LANs typically include, but are not limited to, twisted wire pair or coaxial cable, while communication links between networks may utilize, for example, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Additionally, network 104 and private network 106 may include communication media that embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media capable of layer 3 and layer 4 communication under the OSI model such as, but not limited to, twisted pair, coaxial cable, fiber optics, wave guides, and other wired media and wireless media such as, but not limited to, acoustic, RF, infrared, and other wireless media.

An exemplary embodiment is described in terms of a mobile node 118 that communicates with one or more wireless access points, which are included in a network of wireless access points that communicate with a network monitoring device. In one embodiment, mobile node 118 is a cellular telephone that is arranged to send and receive voice communications and messages such as Short Messaging Service (SMS) messages via one or more wireless communication interfaces. In another embodiment, mobile node 118 is a personal computer.

Figure 2:
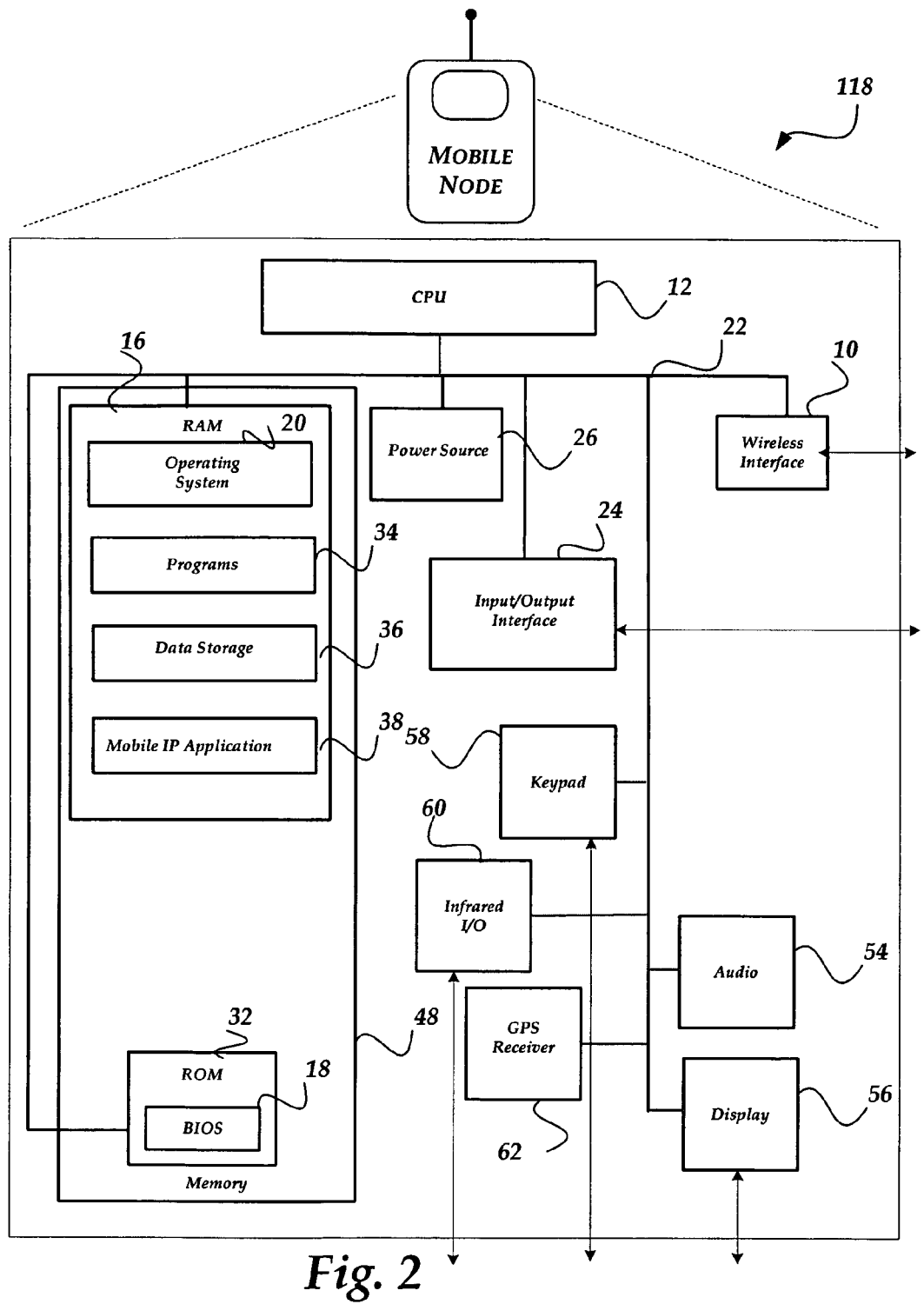
FIG. 2 is a schematic illustration of one embodiment of a mobile node, according to the inventions.

FIG. 2 illustrates one embodiment of a mobile node 118. Fixed nodes 114 and mobile nodes 116 are similar to mobile node 118. Mobile node 118 can include many more components than those shown in FIG. 2. Moreover, some mobile nodes may not have all of the components illustrated in FIG. 2. However, the components shown are sufficient to disclose an illustrative embodiment for practicing the present invention. As shown in the figure, mobile node 118 includes a processing unit 12, a memory 48, a RAM 16, a ROM 32, an operating system 20, programs 34, optional Mobile IP application (e.g., MIPv4 or MIPv6), a data storage 36, a bios 18, a power source 26, an input/output interface 24, a wireless interface 10, an optional audio interface 54, a display 56, a keypad 58, an optional infrared input/output interface 60, and an optional global positioning systems (GPS) receiver 62.

Mobile node 118 can optionally communicate with a wireless access point or other base station (not shown), or directly with another mobile device, via wireless interface 10. Wireless interface 10 includes circuitry for coupling mobile node 118 to various wireless networks, and is constructed for use with various communication protocols including, but not limited to, global system for mobile communications (GSM), code division multiple access (CDMA), Institute for Electrical and Electronics Engineers (IEEE) 802.11, IEEE 802.16 (WiMax), Bluetooth™, user datagram protocol (UDP), transmission control protocol/Internet protocol (TCP/IP), SMS, general packet radio service (GPRS), Wireless Application Protocol (WAP), and the like. Optionally, the mobile node 118 is capable of using Mobile Internet Protocol version 4 (MIPv4) and/or Mobile Internet Protocol version 6 (MIPv6). In conjunction with MIPv4 or MIPv6, the mobile node is capable of using Internet Protocol Security (IPsec), Internet Key Exchange (IKE), and/or Mobile Internet Key Exchange (MOBIKE).

Mobile node 118 is in wireless communication with one or more wireless access points 102, 110. The mobile node can detect the one or more wireless access points, if within the coverage area of one or more access points. Neighboring wireless access points can provide a neighboring communication coverage area that is adjacent to or overlapping the coverage area of a detected wireless access point.

Mass memory 48 generally includes RAM 16, ROM 32, and optionally one or more data storage units 36. Mass memory 48 as described above illustrates a type of computer-readable media, namely computer storage media. Computer storage media may include volatile and nonvolatile, removable and non-removable media implemented in any method or technology for storage of information such as computer readable instructions, data structures, program modules or other data. Examples of computer storage media include RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device. Data storage 36 can be utilized by mobile node 118 to store, among other things, programs 34, databases and/or libraries of images, lists and other data.

The mass memory stores operating system 20 for controlling the operation of mobile node 118. It will be appreciated that this component may include a general purpose operating system such as a version of WINDOWS™, UNIX, or LINUX™, or a specialized mobile communication operating system such as the Symbian® operating system. Basic input/output system ("BIOS") 18 is also provided for controlling the low-level operation of mobile node 118. The mass memory further stores application code and data used by mobile node 118. Also, programs 34 can include computer executable instructions which, when executed by mobile node 118, transmit and receive WWW pages, e-mail, audio, video, and enable telecommunication with another user of another mobile device.

Mobile node 118 also comprises input/output interface 24 for communicating with external devices. Keypad 58 can comprise any input device arranged to receive input from a user. For example, keypad 58 can include a push button numeric dial, or a keyboard. Keypad 58 can also include command buttons that are associated with selecting and sending images. Display 56 can be a liquid crystal display (LCD), plasma display, light emitting diode (LED) display, cathode ray tube (CRT) display, or any other type of display used with a mobile device. Display 56 can also include a touch sensitive screen arranged to receive input from an object such as a stylus or a digit from a human hand. Additionally, infrared input/output 60 can be used to send and receive infrared commands to/from other devices.

Power supply 26 provides power to mobile node 118. A rechargeable or non-rechargeable battery can be used to provide power. The power can also be provided by an external power source, such as an AC adapter or a powered docking cradle that supplements and/or recharges a battery.

Figure 3:
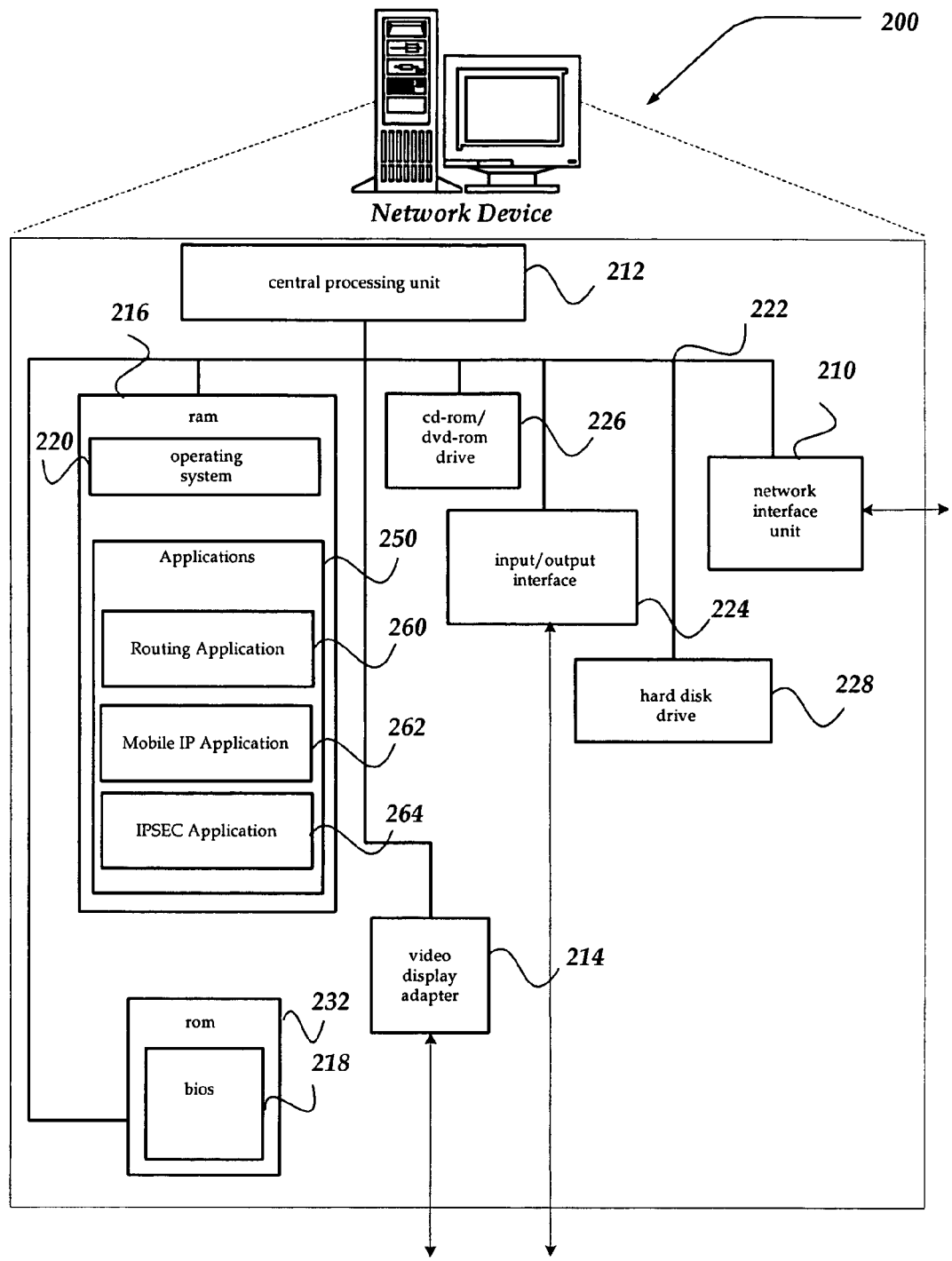
FIG. 3 is a schematic illustration of one embodiment of a server, firewall, gateway, or home agent, according to the inventions.
Figure 4:
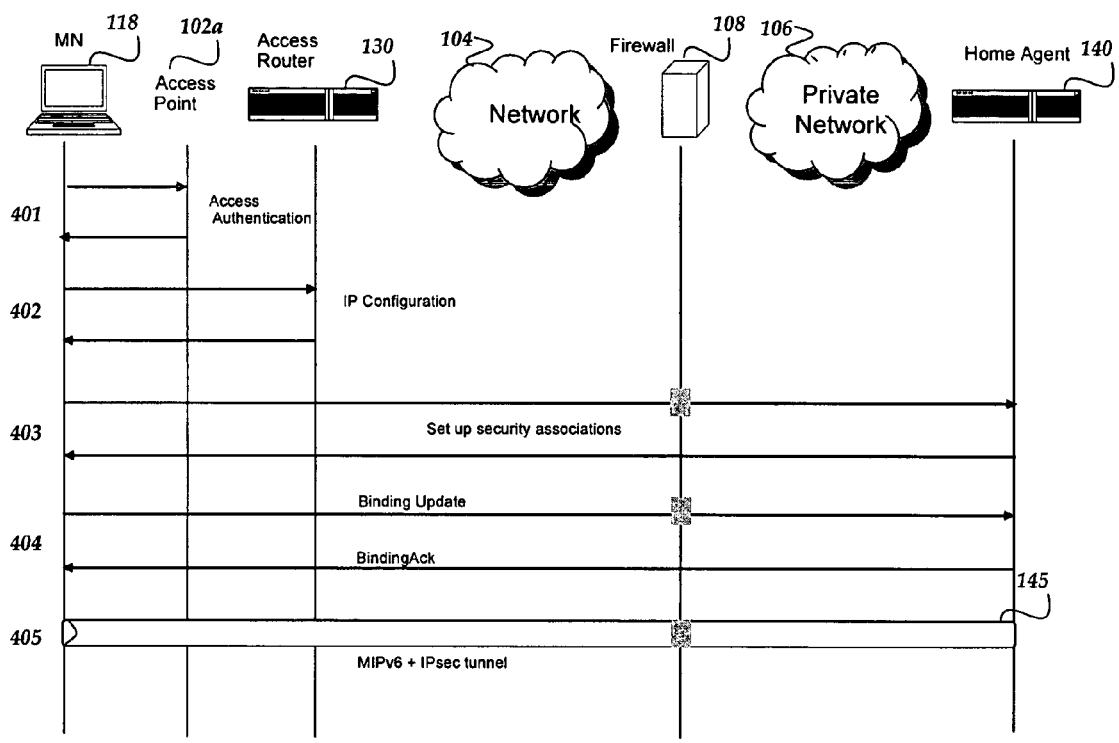
FIG. 4 is a schematic illustration of one embodiment of a method of connecting a mobile node to a private network through an access point on a network, according to the inventions.
Figure 5:
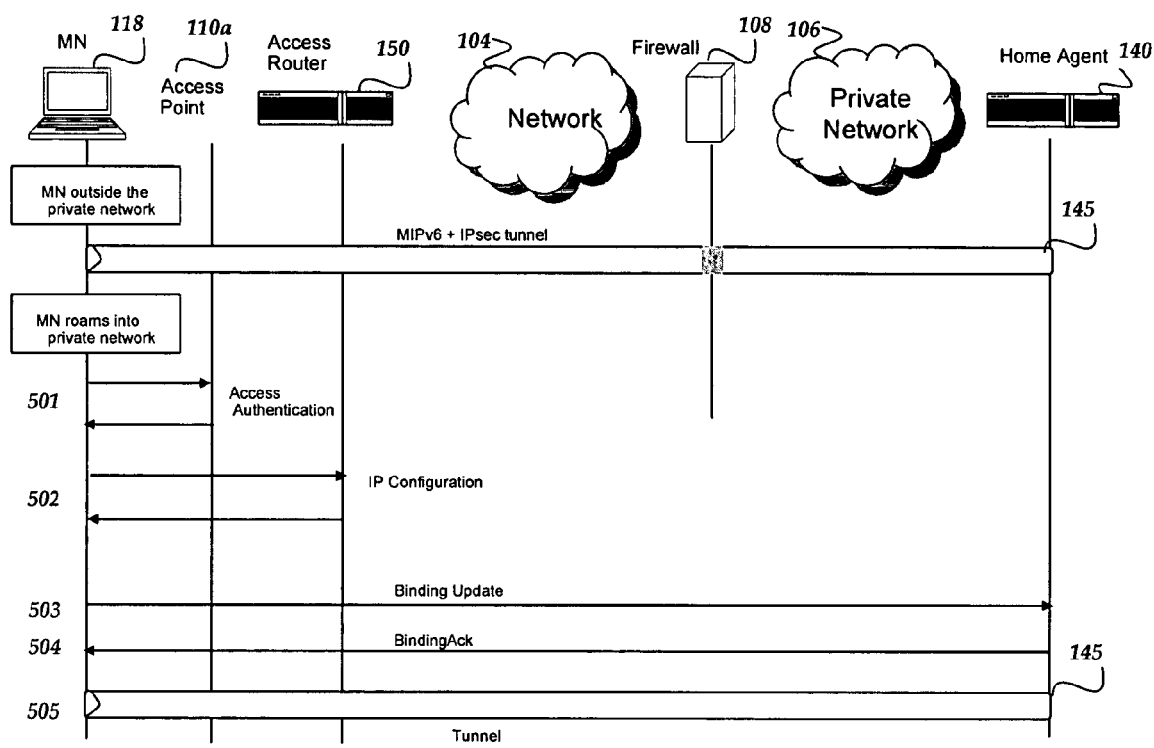
FIG. 5 is a schematic illustration of one embodiment of a method for maintaining the connection illustrated in FIG. 4 when the mobile node roams into the private network, according to the inventions.
Figure 6:
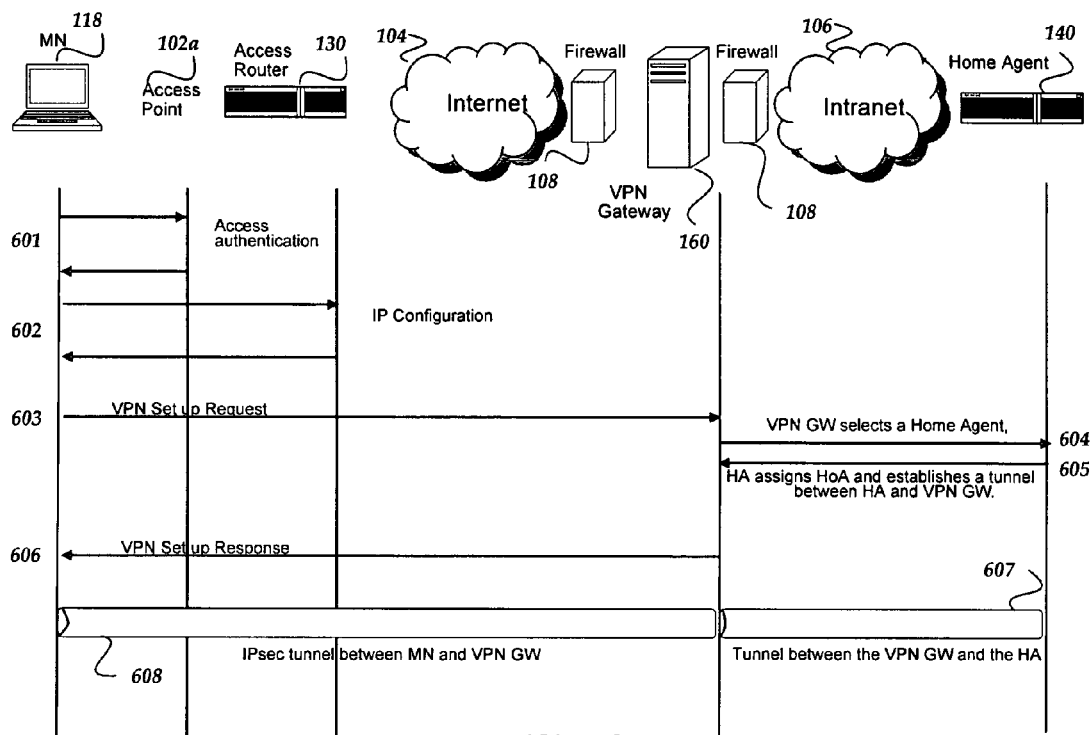
FIG. 6 is a schematic illustration of another embodiment of a method of connecting a mobile node to a private network through an access point on a network, according to the inventions.
Figure 7:
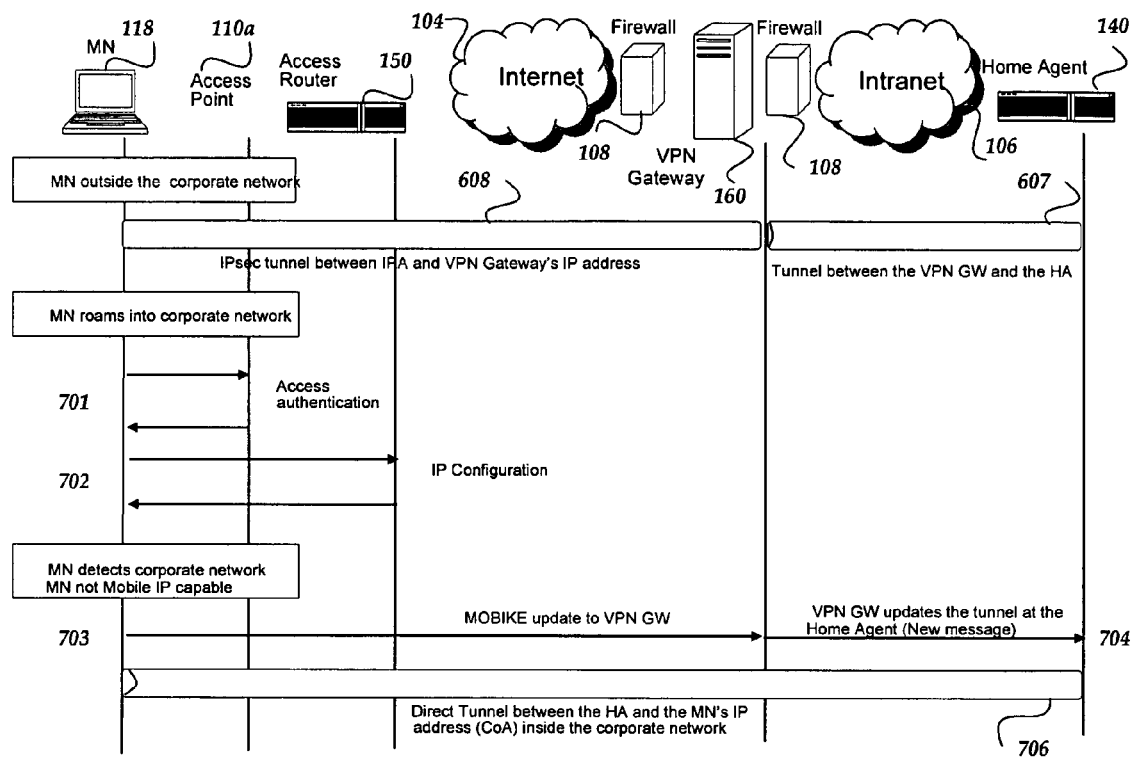
FIG. 7 is a schematic illustration of one embodiment of a method for maintaining the connection illustrated in FIG. 6 when the mobile node roams into the private network, according to the inventions.
Figure 8:
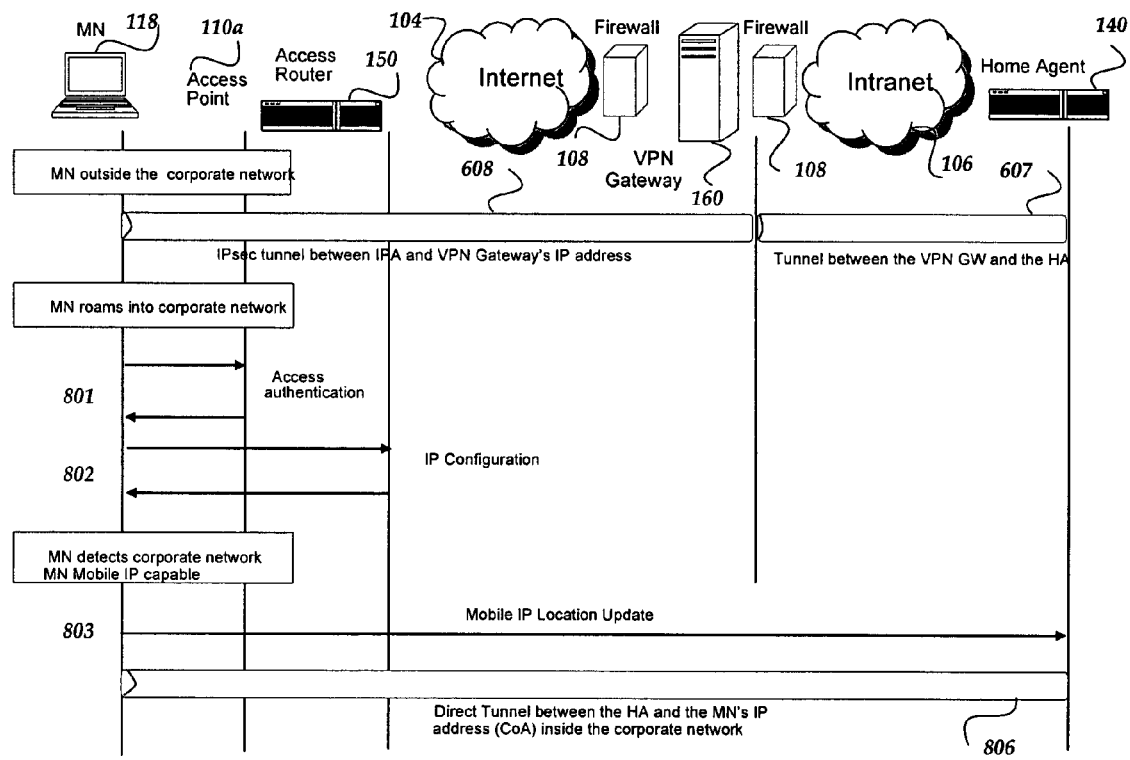
FIG. 8 is a schematic illustration of another embodiment of a method for maintaining the connection illustrated in FIG. 6 when the mobile node roams into the private network, according to the inventions.

FIG. 3 shows one embodiment of a network device for enabling the operation of a gateway, a server, or a router, such as firewall/gateway 108 of FIGS. 1 and 4-8, server 112 of FIG. 1, home agent of FIGS. 4-8, and VPN gateway of FIGS. 6-8, according to one embodiment of the invention. Network device 200 may include many more components than those shown and some devices may not include all of the illustrated components. The components shown, however, are sufficient to disclose an illustrative embodiment for practicing the invention.

Network device 200 includes processing unit 212, video display 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 3, network device 200 also can communicate with network 104 or private network 106 of FIG. 1, or some other communications network, via network interface unit 210, which is constructed for use with various communication protocols including, but not limited to the RIP, OSPF, SNMP, HTTP, UDP/IP, TCP/IP, MIPv4, and MIPv6 protocols, and the like. For example, in one embodiment, network interface unit 210 may employ a hybrid communication scheme using both TCP and IP multicast. Network interface unit 210 is sometimes known as a transceiver, network interface card (NIC).

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPsec, and the like.

Network device 200 can also include input/output interface 224 for communicating with external devices, such as a mouse, keyboard, scanner, or other input devices not shown in FIG. 3. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

One or more applications 250 may be loaded into mass memory and run on operating system 220. Examples of application programs may include transcoders, schedulers, graphics programs, database programs, word processing programs, HTTP programs, user interface programs, various security programs, and so forth. Mass storage may further include applications such as routing application 260, Mobile IP application (MIPv4 and/or MIPv6) 262, and IPsec application 264. These applications may also interact with other components residing on the network device, another network device, gateway, and the like.

Although illustrated in FIG. 2 as distinct components, routing application 260, Mobile IP application 262, and IPsec application 264 may be arranged, combined, and the like, in any of a variety of ways, without departing from the scope of the invention. For example, components of Mobile IP application 262 and IPsec application 264 may be integrated as a single application, or several applications. Moreover, components of Mobile IP application 262, IPsec application 264, and the like, may reside in one or more computing devices similar to network device 200.

A private network, such as a virtual private network (VPN), can provide a relatively secure way to connect nodes on internal trusted networks that are remote from each other, such as clients, servers, and host computers. Encryption and other security mechanisms are typically employed to create secure point to point "tunnels" for plain text messages/packets between authorized users over an untrusted external network. The IPsec application is one method of providing encryption and security for packets on a private network or being transferred between components of a private network over an untrusted external network. Typically, "plain text" packets are encrypted and inserted into an outer packet. The inner "plain text" packet is subsequently "tunneled" (forwarded) over the untrusted external IP network from, for example, one VPN gateway to another VPN gateway where the outer packet is decrypted and the inner "plain text" packet is forwarded towards its destination on the internal network. The other packet serves as a protective shell or encapsulation for the "plain text" packet as it is tunneled from one node to another node over the external untrusted network.

Typically, a gateway in a VPN also operates as a router for IP traffic on their internal networks. For example, upon receiving a "plain text" packet from a node on a trusted internal network, the VPN gateway (VPN GW) looks up the destination in a selector list to see whether or not the packet was directed to a destination outside the locally attached internal network and if it should be encrypted for tunneling to the destination. If true, the VPN gateway securely tunnels the "plain text" packet to a particular VPN gateway peer associated with the destination over an external untrusted network. The particular VPN gateway peer determines if the destination of this tunneled packet is on their own selector list. And if so, decrypts the encrypted packet and forwards it to a node on its locally attached internal network. Additionally, if the destination of the "plain text" packet had not been on the selector list but had been an entry in a routing table, the VPN gateway would have forwarded the unencrypted plain text packet to the destination.

In at least some embodiments, when a mobile node 118 is roaming the mobile node has a home address (HoA) that is provided to other nodes (e.g., a correspondent node) that wish to communicate with the mobile node. The home address is associated with a home agent (HA) which is in the private network 106 and is often a router. The home agent has a fixed address and maintains current location information for the mobile node 118.

When a mobile node connects to an access point (e.g., access point 102a) or is handed off to another access point (e.g., access point 102b or 110a), the mobile node receives a new IP address. In one embodiment, this IP address is then provided to the home agent as the mobile node's care-of address (CoA). Packets addressed to the mobile node from the correspondent node are directed, first, to the home agent using the home address and then the home agent directs the packets to the mobile node using the mobile node's current care-of-address. Moreover, packets addressed to a correspondent node from the mobile node are directed to the home agent and then forwarded to the correspondent node.

By using a home agent, even though a mobile node is roaming and connects through different access points, only the home agent needs to know the mobile node's current care-of address. The home address is provided to other nodes so that packets sent to the mobile node can be forwarded to the home agent. The home agent maintains the current care-of address for the mobile node so that the home agent can then route the packets to the care-of address.

FIG. 4 schematically illustrates one embodiment of a method and system for connecting a mobile node to a private network. In this embodiment, the mobile node is capable of MIPv6. In this procedure, a home agent 140 within the private network 106 is used to make the connection. When the mobile node 118 is roaming, the mobile node has a home address associated with the home agent. This home address is provided to other nodes (e.g. a correspondent node) so that packets are addressed to the mobile node are sent to the home agent and then forwarded to the mobile node. The home agent maintains a current care-of address for the mobile node so that the home agent can then route the packets to the care-of address. In this embodiment, a mobile node connected to an access point outside the private network does not connect to a private network gateway (e.g., a VPN gateway), but instead connects directly to a home agent. The private network firewall is configured to allow passage of traffic (e.g., packets) that has a known home agent as a destination. Typically, IPsec encryption is applied directly between the mobile node and the home agent in this embodiment. Preferably, the private network firewall only allows traffic that is IKE related or protected by IPsec.

To establish contact with the private network 106, mobile node 118 performs access authentication at layer 2, if required, with an access point 102a to the network 104 (step 401). Any authentication procedure can be used including, for example, IEEE 802.1x. After authentication, the mobile node 118 configures an access router 130 to provide a care-of address for the mobile node, DNS information, etc (step 402). The selection of a care-of address can use any method including, for example, Dynamic Host Configuration Protocol (DHCP) or DHCPv6.

The mobile node 118 then sets up a security association with its home agent 140 (step 403). This can be accomplished using any suitable method or protocol including, for example, IKE negotiation with the home agent. This may involve the mobile node authenticating the home agent through mechanisms such as, for example, Secure ID, PKI (Public Key Infrastructure), or EAP (Extensible Authentication Protocol). Such mechanisms may include use of a server to authenticate the mobile node user. The home agent may treat the initial IKE negotiation as VPN setup using IKE.

The firewall 108 that protects the private network 106 is arranged to pass through IKE messages that are destined to a known home agent. The home agent preferably has software to screen these IKE messages and protect the private network from attack. Once the IKE negotiation is complete, the mobile node and the home agent have set up the security association to protect MIPv6 signaling messages, as well as all data traffic.

The mobile node 118 then sends a binding update to inform the home agent 140 of its current location (step 404). The home agent sends a binding acknowledgement in return. The mobile node 118 will send a new binding update every time the mobile node moves to a new access point outside the private network (e.g., from access point 102a to access point 102b) or within the private network (e.g., from access point 102a to access point 110a) and thereby obtains a new care-of address. The home agent will then update the IPsec security association database and the care-of address entry for the mobile node in the binding cache.

Once the binding update and acknowledgement have been made, a tunnel 145 between the mobile node 118 and home agent 140 is set up (step 405). This tunnel is protected using IPsec encryption. The firewall is, again, configured to allow traffic through which is secured using IPsec and is directed to a known home agent. The home agent preferably has software to screen these packets and protect the private network from attack. Packets traveling along the tunnel will be encapsulated with a header containing the mobile node's care-of address and the home agent's address. The inner packet will contain the mobile node's home address and the correspondent node's address. Optionally, route optimization methods, such as those available under MIPv6, may be employed between the mobile node and correspondent nodes.

FIG. 5 illustrates a procedure to maintain the connection between the mobile node and the private network when the mobile node 118 begins to roam inside the private network 106 after establishment of the tunnel 145 as described with reference to FIG. 4 (step 501). When the mobile node communicates with an access point 110b within the private network 106, the mobile node authenticates itself at layer 2, if required (step 502). Any authentication procedure can be used including, for example, IEEE 802.1x.

An access router 150 within the private network 106 is configured with DNS information, a care-of-address, etc. (step 503). The mobile node then sends a binding update directly to the home agent and receives a binding acknowledgment (Step 504). The home agent will then update the IPsec security association database and the care-of address entry for the mobile node in the binding cache.

The home agent and mobile node then maintain the tunnel 145 (step 505). In this instance, however, the tunnel no longer traverses the firewall 108. Optionally, the tunnel 145 can be maintained without IPsec encryption, particularly if the private network maintains layer 2 encryption. Optionally, route optimization methods, such as those available under MIPv6, may be employed between the mobile node and correspondent nodes.

If the mobile node subsequently roams outside of the private network, the tunnel can be retained with IPsec encryption maintained or reinstated. The mobile node will send a binding update and the home agent will send a binding acknowledgement and update the IPsec security association and binding cache as described above. However, if the IPsec security associations have expired, the mobile node may need to reestablish the security association, for example, using IKE.

FIG. 6 illustrates another embodiment of a procedure for connecting a mobile node to a private network. In this embodiment, the mobile node 118 and home agent 140 are used, but there is also a VPN gateway 160 disposed between the mobile node and home agent. To establish contact with the private network 106, mobile node 118 performs access authentication at layer 2, if required, with an access point 102a to the network 104 (step 601). Any authentication procedure can be used including, for example, IEEE 802.1x. After authentication, the mobile node 118 configures an access router 130 to provide a care-of address for the mobile node, DNS information, etc (step 602). The selection of a care-of address can use any method including, for example, Dynamic Host Configuration Protocol (DHCP) or DHCPv6.

The mobile node 118 then initiates IKE negotiation to set up a security association with the VPN gateway 160 (step 603). The VPN gateway then selects a home agent (step 604). If the mobile node is mobile IP capable (e.g., capable of MIPv4 or MIPv6) then the VPN gateway can select the home agent 140 maintained on the mobile node's profile. Alternatively, or if the mobile node is not Mobile IP capable, the VPN gateway can select any home agent 140 of the private network 106.

The VPN gateway then sends a message to the selected home agent, requesting that it assign a home address for the mobile host. This message may be protected using a pre-existing security association between the home agent and the VPN gateway. The home agent procures an IPT (Internet Protocol Transport) address using any suitable methods, such as DHCP or DHCPv6. This IPT address becomes the home address for the mobile node. The home agent then establishes a route table entry to tunnel all arriving packets for the mobile node to the VPN gateway using the home address. The home agent informs the VPN gateway of the home address (step 605). The VPN gateway associates the home address with the current care-of address of the mobile node and will update this association as the mobile node's care-of address changes. A tunnel 607 is also established between the VPN gateway and the home agent. All packets for the mobile node are then routed by the home agent to the VPN gateway. Similarly, all of the packets from the mobile node can be routed from the VPN gateway to the home agent. Optionally, packets from the mobile node can be routed by the VPN gateway directly to their destination rather than to the home agent.

Once the VPN gateway receives the home address, the VPN gateway sends a setup response with the home address to the mobile node (step 606). An IPsec tunnel 608 is also set up between the mobile node 118 and the VPN gateway 160. Optionally, route optimization methods, such as those available under MIPv6, may be employed between the mobile node and correspondent nodes.

In operation, packets from a correspondent node are directed to the home agent 140 using the home address. The home agent encapsulates the packet with the VPN gateway's address and directs the packets to the VPN gateway. The VPN gateway deencapsulates the packets, looks up the mobile node's care-of address based on the home address on the inner packet and encapsulates the packets with the care-of address and forwards the packets to the mobile node. Conversely, packets from the mobile node are encapsulated with the mobile node's care-of address as the source address and the VPN gateway's address as the destination address and sent to the VPN gateway. The VPN gateway then deencapsulates the received packets and encapsulates the packets with the home agent's address and forwards the packets to the home agent. The home agent then sends the packets to the correspondent node. Optionally, the VPN gateway can send the packets directly to the correspondent node instead of the home agent. In all of these cases, the inner packet contains the mobile node's home address and the correspondent node's address.

FIGS. 7 and 8 illustrate procedures when the mobile node roams into the private network after establishment of tunnels 607, 608. FIG. 7 illustrates one embodiment of a procedure if the mobile node is not Mobile IP capable. In this instance, when the mobile node communicates with an access point 110b within the private network 106, the mobile node authenticates itself at layer 2, if required (step 701). Any authentication procedure can be used including, for example, IEEE 802.1x. After authentication, the mobile node 118 configures an access router 150 within the private network to provide a care-of address for the mobile node, DNS information, etc (step 702). The selection of a care-of address can use any method including, for example, Dynamic Host Configuration Protocol (DHCP) or DHCPv6.

The mobile node then sends an update, using a protocol such as MOBIKE, to the VPN gateway to update the position of the mobile node in the private network (step 703). The VPN gateway then sends a message to update the home agent (step 704). A tunnel 706 can then be established directly between the home agent and the mobile node without going through the VPN gateway. In some instances, the mobile node will become aware that tunnel 706 is or can be established when the mobile node receives packets directly from the home agent instead of the VPN gateway. In other instances, a MOBIKE update message from the VPN gateway may include an extension that indicates to the mobile node that a direct tunnel 706 can be set up with the home agent. However, the mobile node will typically contact the VPN gateway, using a protocol such as MOBIKE, each time it moves to a new access point within the private network. Optionally, route optimization methods, such as those available under MIPv6, may be employed between the mobile node and correspondent nodes.

FIG. 8 illustrates one embodiment of a procedure if the mobile node is Mobile IP capable. It will be understood that one alternative for Mobile IP capable mobile nodes is the procedure illustrated in FIG. 7. In this instance, When the mobile node communicates with an access point 110b within the private network 106, the mobile node authenticates itself at layer 2, if required (step 801). Any authentication procedure can be used including, for example, IEEE 802.1x. After authentication, the mobile node 118 configures an access router 150 within the private network to provide a care-of address for the mobile node, DNS information, etc (step 802). The selection of a care-of address can use any method including, for example, Dynamic Host Configuration Protocol (DHCP) or DHCPv6.

The mobile node then sends a Mobile IP update directly to the home agent to update the position of the mobile node in the private network (step 803). A tunnel 806 can then be established directly between the home agent and the mobile node without going through the VPN gateway. Optionally, route optimization methods, such as those available under MIPv6, may be employed between the mobile node and correspondent nodes.

If the mobile node subsequently roams outside of the private network, the tunnels between the mobile node and the VPN gateway and between the VPN gateway and the home agent can be reinstated. The mobile node will send an update to the VPN gateway and the gateway will set up the tunnel with the home agent and the tunnel with the mobile node in a manner similar to steps 603, 605, and 606 of FIG. 6. However, if the IPsec security associations have expired, the mobile node may need to reestablish the security association, for example, using IKE.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method, comprising:
   connecting a mobile node to an access point outside a private network;
   forming an internet protocol security tunnel between the mobile node and a home agent on the private network for a transfer of packets;
   roaming the mobile node into a region of the private network and connecting the mobile node to the private network using a private network access point, while maintaining the internet protocol security tunnel between the mobile node and the home agent,
   wherein when the mobile node is outside the private network forming the internet protocol security tunnel between the mobile node and the home agent further comprises forming an internet protocol security tunnel between the mobile node and a private network gateway and forming an internet protocol security tunnel between the private network gateway and the home agent, wherein when the mobile nodes roams into the region of the private network, the internet protocol security tunnel is maintained between the mobile node and the home agent without traversing the private network gateway, and
   wherein roaming the mobile node into the private network comprises sending, by the mobile node, an update message to the home agent, and receiving an acknowledgement message from the home agent, wherein the acknowledgment message indicates that the home agent has updated the security association and an internet protocol address for the mobile node.

2. The method of claim 1, wherein maintaining the internet protocol security tunnel between the mobile node and the home agent comprises restructuring the internet protocol security tunnel between the mobile node and the private network gateway and the internet protocol security tunnel between the private network gateway and the home agent into an internet protocol security tunnel directly between the mobile node and the home agent.

3. The method of claim 1, wherein connecting the mobile node to the access point comprises connecting a mobile node configured to use a mobile internet protocol to the access point.

4. The method of claim 1, wherein connecting the mobile node to the access point comprises connecting a mobile node configured to use mobile internet protocol version 6.

5. The method of claim 1, wherein forming the internet protocol security tunnel between the mobile node and the home agent comprises setting up a security association between the mobile node and the home agent through a firewall of the private network, wherein the firewall is configured to allow passage of a security association message from the mobile node and directed to the home agent.

6. The method of claim 5, wherein setting up a security association comprises setting up a security association using internet protocol security.

7. The method of claim 6, wherein maintaining the internet protocol security tunnel between the mobile node and the home agent comprises maintaining the internet protocol security association.

8. The method of claim 1, wherein forming the internet protocol security tunnel between the mobile node and the home agent comprises forming the internet protocol security tunnel through a firewall of the private network, wherein the firewall is configured to allow passage of packets from the mobile node directed to the home agent.

9. A method, comprising:
   connecting a mobile node to an internet access point;
   setting up a security association between the mobile node and a home agent on a private network through a firewall using the internet access point, wherein the firewall is configured to allow passage of a security association message from the mobile node and directed to the home agent; and
   when the security association is set up, forming an internet protocol security tunnel between the mobile node and the home agent for a transfer of packets,
   wherein forming the internet protocol security tunnel between the mobile node and the home agent comprises forming a internet protocol security tunnel between the mobile node and a private network gateway and forming a internet protocol security tunnel between the private network gateway and the home agent, and
   wherein setting up the security association between the mobile node and the home agent comprises sending, by the mobile node, an update message to the home agent when the mobile node roams into the private network, and receiving an acknowledgement message from the home agent, wherein the acknowledgment message indicates that the home agent has updated the security association and an internet protocol address for the mobile node, wherein the internet protocol security tunnel is maintained, when the mobile roams into the private network, directly between the mobile node and the home agent without traversing the private network gateway.

10. A system, comprising:
    a private network comprising a home agent and a gateway; and
    a mobile node,
    wherein the mobile node and the private network are configured to allow the mobile node to connect to the private network through an access point outside the private network to form an internet protocol security tunnel between the mobile node and the home agent, and to maintain the internet protocol security tunnel directly between the home agent and the mobile node without traversing the gateway, when the mobile node roams into the private network and connects to the private network through an access point of the private network,
    wherein, when the mobile node roams outside the private network, the internet protocol security tunnel between the mobile node and the home agent comprises a tunnel between the mobile node and the gateway and a tunnel between the gateway and the home agent, and
    wherein, when the mobile node roams into the private network, the mobile node is configured to send an update message to the home agent, and the home agent is configured to send an acknowledgement message to the mobile node in response to the updated message and further configured to update a security association and an internet protocol address for the mobile node.

11. The system of claim 10, wherein the mobile node is mobile internet protocol capable.

12. The system of claim 11, wherein the mobile node is mobile internet protocol version 6 capable.

13. The system of claim 10, wherein the mobile node and the home agent are configured to maintain the internet protocol security tunnel when the mobile node roams into the private network and connects to the private network through the access point of the private network by forming an internet protocol security tunnel directly between the mobile node and the home agent.

14. The system of claim 10, wherein the private network further comprises a firewall, wherein the firewall is configured to allow passage of security association messages from the mobile node to the home agent.

15. The system of claim 14, wherein the mobile node and private network are internet protocol security capable and the firewall is configured to allow passage of internet protocol security association messages from the mobile node to the home agent.

16. The system of claim 10, wherein the mobile node and private network are mobile internet protocol version 6 and internet protocol security capable and a firewall is configured to allow passage of packets with internet protocol security encryption between the mobile node and the home agent.

17. The system of claim 16, wherein the mobile node and the home agent are configured to maintain the internet protocol security tunnel when the mobile node roams into the private network and connects to the private network through an access point of the private network by maintaining the internet protocol security tunnel without internet protocol security encryption.

18. An apparatus, comprising:
at least one processor; and
at least one memory including computer program code,
wherein the at least one memory and the computer program code are configured to, with the at least one processor, cause the apparatus at least to
connect to a private network through an access point outside the private network to form an internet protocol security tunnel between the apparatus and a home agent in the private network and to maintain the tunnel directly between the home agent and the apparatus when the apparatus roams into the private network and connects to the private network through an access point of the private network,
form an internet protocol security tunnel between the apparatus and a private network gateway and to form an internet protocol security tunnel between the private network gateway and the home agent
send, when the apparatus roams into the private network, an update message to the home agent, and
receive an acknowledgement message from the home agent indicating that a security association and an internet protocol address are updated for the apparatus, wherein the tunnel is maintained, when the apparatus roams into the private network, directly between the apparatus and the home agent without traversing a private network gateway.

19. A system, comprising:
a home agent; and
at least one access point;
wherein the system is configured to connect a mobile node through an access point outside the system to form an internet protocol security tunnel between the mobile node and the home agent and to maintain the internet protocol security tunnel directly between the home agent and the mobile node when the mobile node roams into the system and connects to the system through an access point of the system,
wherein the system is a virtual private network and comprises a virtual private network gateway, and the tunnel between the mobile node and the home agent comprises a first internet protocol security tunnel between the virtual private network gateway and the mobile node and a second internet protocol security tunnel between the virtual private network gateway and the home agent,
wherein the home agent is configured to receive an update message from the mobile node when it roams into the system, and further configured to send an acknowledgment message to the mobile node, indicating that a security association and an internet protocol address are updated for the mobile node, wherein the tunnel is maintained, when the mobile node roams into the private network, directly between the mobile node and the home agent without traversing the virtual private network gateway.

20. A system, comprising:
network means for providing a shared communication space, the network means comprising a home agent; and
communication means for communicating via the shared communication space,
wherein the communication means and the network means for allowing the communication means to connect to the network means through an access point outside the network means to form an internet protocol security tunnel between the communication means and the home agent, and to maintain the internet protocol security tunnel directly, without traversing a network means gateway, between the home agent and the communication means when the communication means roams into the network means and connects to the network means through an access point of the connection means,
wherein the internet protocol security tunnel between the home agent and the communication means comprises an internet protocol security tunnel between the home agent and network means gateway and an internet protocol security tunnel between the network means gateway and the communications means, and
wherein, when the communication means roams into the network means, the communication means is further for sending an update message to the home agent, and the home agent is configured to send an acknowledgement message to the communication means in response to the updated message and further configured to update a security association and an internet protocol address for the communication means.

21. An apparatus, comprising:
transmitting means for communicating with a home agent of a private network;
receiving means for receiving a transmission from the home agent; and
processing means for connecting the apparatus to the private network though an access point outside the private network to form an internet protocol security tunnel directly between the apparatus and the home agent in the private network, and to maintain the internet protocol security tunnel directly, without traversing a private network gateway, between the home agent and the apparatus when the apparatus roams into the private network and connects to the private network through the access point of the private network, wherein the internet protocol security tunnel between the home agent and the apparatus comprises an internet protocol security tunnel between the apparatus and the private network gateway and an internet protocol security tunnel between the private network gateway and the home agent, wherein the transmitting means is further for sending, when the apparatus roams into the private network, an update message to the home agent, and wherein the receiving means is further for receiving an acknowledgement message from the home agent indicating that a security association and an internet protocol address are updated for the apparatus.

22. A system, comprising:

routing means for connecting a mobile node to the system; and at least one accessing means for providing a connection to the system, wherein the system is configured to connect the mobile node through an accessing means outside the system to form an internet protocol security tunnel directly between the mobile node and the routing means and to maintain the internet protocol security tunnel directly between the routing means and the mobile node when the mobile node roams into the system and connects to the system through the accessing means of the system, wherein the internet protocol security tunnel between the mobile node and the router means comprises an internet protocol security tunnel between the mobile node and a private network gateway and an internet protocol security tunnel between the private network gateway and the routing means, wherein the routing means is further for receiving an update message from the mobile node when it roams into the system, and further for sending an acknowledgment message to the mobile node, indicating that a security association and an internet protocol address are updated for the mobile node, wherein the tunnel is maintained, when the mobile node roams into the private network, directly between the mobile node and the home agent without traversing the private network gateway.

* * * * *